United States Patent [19]
Jonsson et al.

[11] Patent Number: 5,513,246
[45] Date of Patent: Apr. 30, 1996

[54] RADIOTELEPHONE LOCATING AND HANDOFF USING ALTERNATIVE CRITERIA

[75] Inventors: Sven-Olof L. Jonsson, Hortlax; Georg W. R. Chambert, Uppsala; Stig R. Bodin, Spånga, all of Sweden

[73] Assignee: Telefonaktiebolaget LM Ericsson, Stockholm, Sweden

[21] Appl. No.: 790,170

[22] Filed: Nov. 12, 1991

[30] Foreign Application Priority Data

Dec. 7, 1990 [SE] Sweden .................. 9003913

[51] Int. Cl.⁶ .......................... H04M 11/00; H04Q 7/00; H04Q 9/00
[52] U.S. Cl. .................. 379/60; 379/59; 455/33.1; 455/33.2; 455/34.1
[58] Field of Search .............. 379/59, 60; 455/33.1, 455/33.2, 34.1

[56] References Cited

U.S. PATENT DOCUMENTS

| | | | |
|---|---|---|---|
| 4,144,411 | 3/1979 | Frenkiel | 379/60 |
| 4,527,284 | 7/1985 | Rottger | 455/33.2 |
| 4,608,711 | 8/1986 | Goldman | 379/60 |
| 4,670,899 | 6/1987 | Brody et al. | 379/59 |
| 4,670,906 | 6/1987 | Thro | 455/33.1 |
| 4,718,081 | 1/1988 | Brenig | 379/60 |
| 4,765,753 | 8/1988 | Schmidt | 379/60 |
| 4,771,448 | 9/1988 | Koohgoli et al. | 379/60 |
| 4,866,710 | 9/1989 | Schaeffer | 370/95.1 |
| 4,887,265 | 12/1989 | Felix | 379/59 |
| 5,081,671 | 1/1992 | Raith et al. | 379/60 |
| 5,095,500 | 3/1992 | Tayloe et al. | 379/59 |
| 5,175,867 | 12/1992 | Wejke et al. | 379/60 |
| 5,179,559 | 1/1993 | Crisler et al. | 379/60 |
| 5,203,010 | 4/1993 | Felix et al. | 455/33.2 |
| 5,214,789 | 5/1993 | George | 455/33.2 |
| 5,239,676 | 8/1993 | Strawczynski | 379/60 |
| 5,243,598 | 9/1993 | Lee | 379/60 |

FOREIGN PATENT DOCUMENTS 0255628  2/1988  European Pat. Off. .

Primary Examiner—Stephen Chin
Assistant Examiner—Vijay Shankar
Attorney, Agent, or Firm—Burns, Doane, Swecker & Mathis

[57] ABSTRACT

In a cellular mobile radiotelephone system having a plurality of cells providing radio coverage by a plurality of base stations and having a plurality of mobile stations, the location of a mobile station with respect to cell boundaries is identified using measurements, performed at the mobile station or at selected cells, of transmissions from the cells or transmissions from the mobile station. When a cell is found that meets a specified standard with respect to a call connection in progress according to a first radio-signal criterion, a handoff candidate cell is selected according a second different radio-signal criterion. When no cell is found that meet the specified standard, a cell is selected according to the first radio-signal criterion. Handoff to the selected cell is attempted if that cell is not presently handling that call. More particularly, the first radio-signal criterion may be signal strength and the second radio-signal criterion may be path loss. When a cell is found that meets the signal-strength criterion, the cell is determined to have sufficient signal strength margin so that the path loss criterion may be used instead. As mentioned above, use of the path loss criterion has the advantages of conserving power, reducing interference, and allowing effective cell boundaries to remain fixed. When no cell is found that meets the signal-strength criterion, the call connection is determined to be signal-strength limited such that the signal strength criterion is used to select the cell having the greatest signal strength.

9 Claims, 9 Drawing Sheets

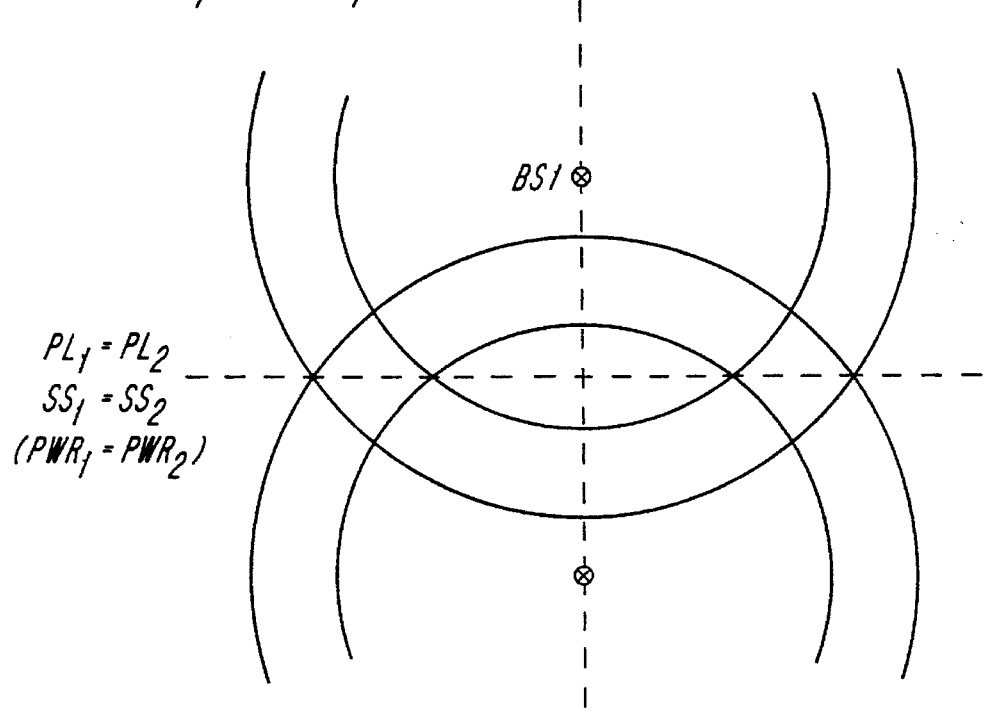
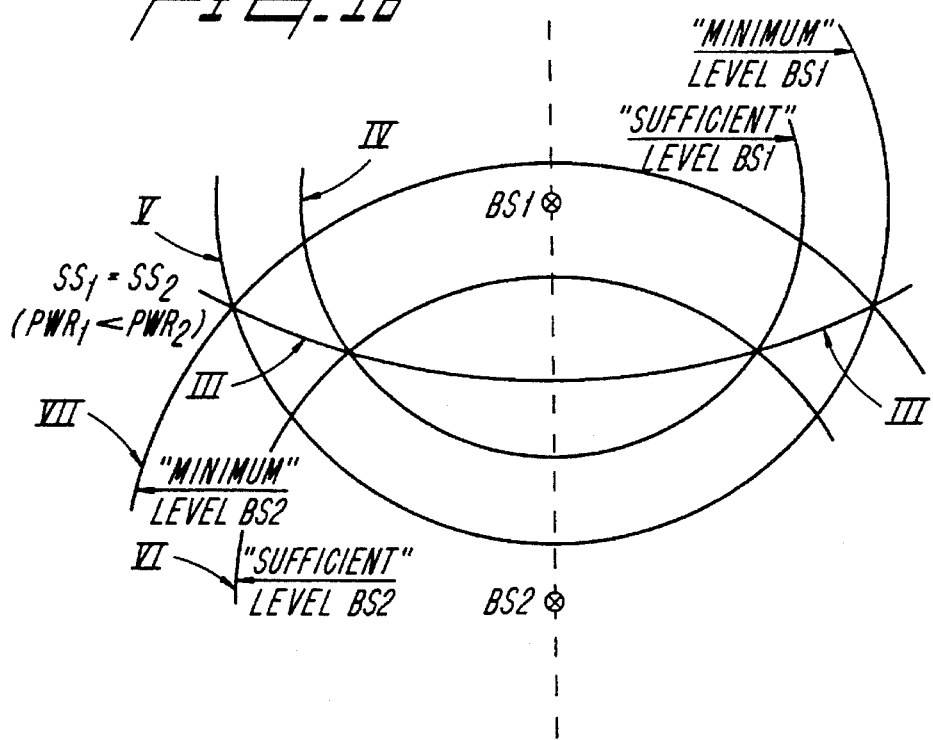

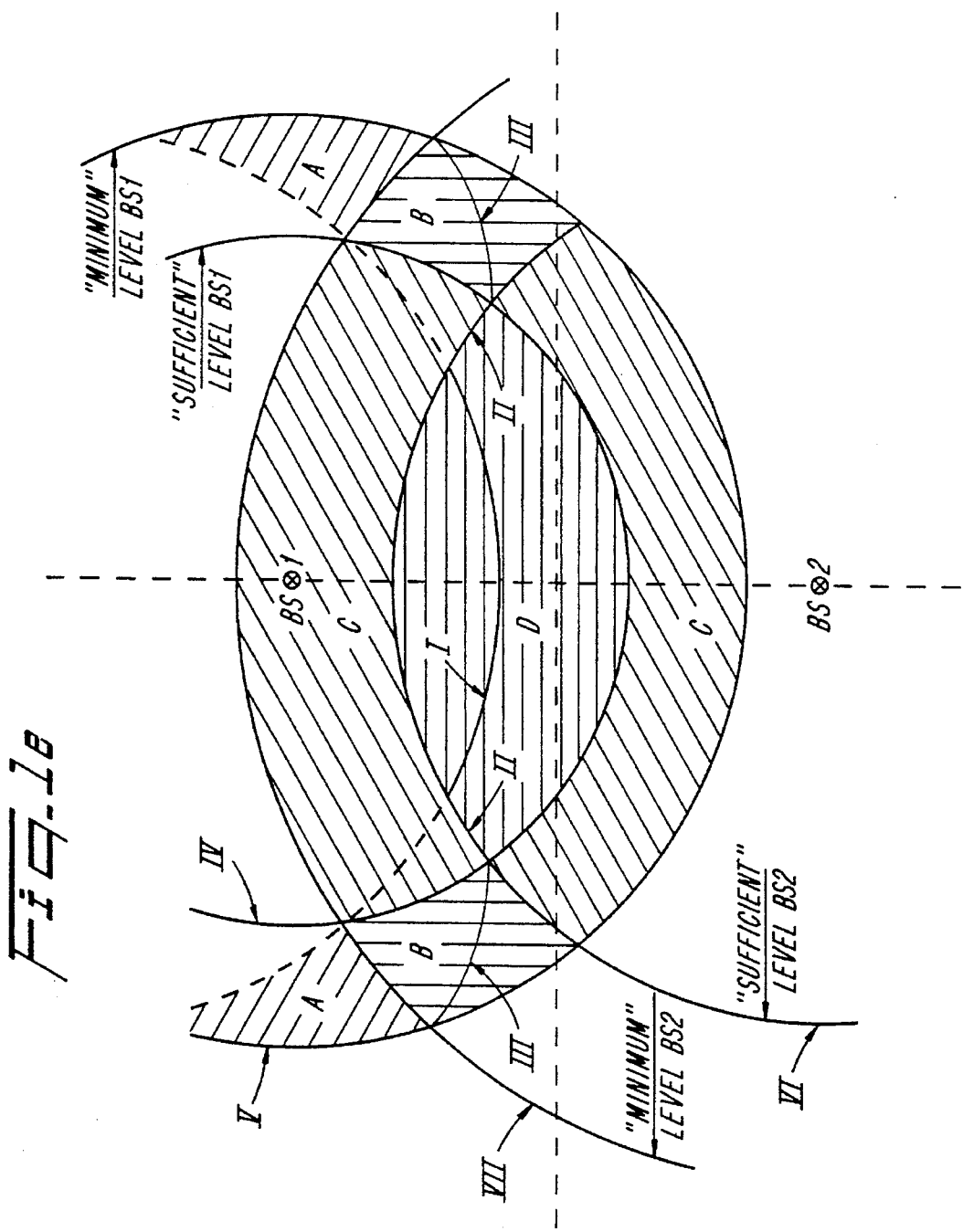

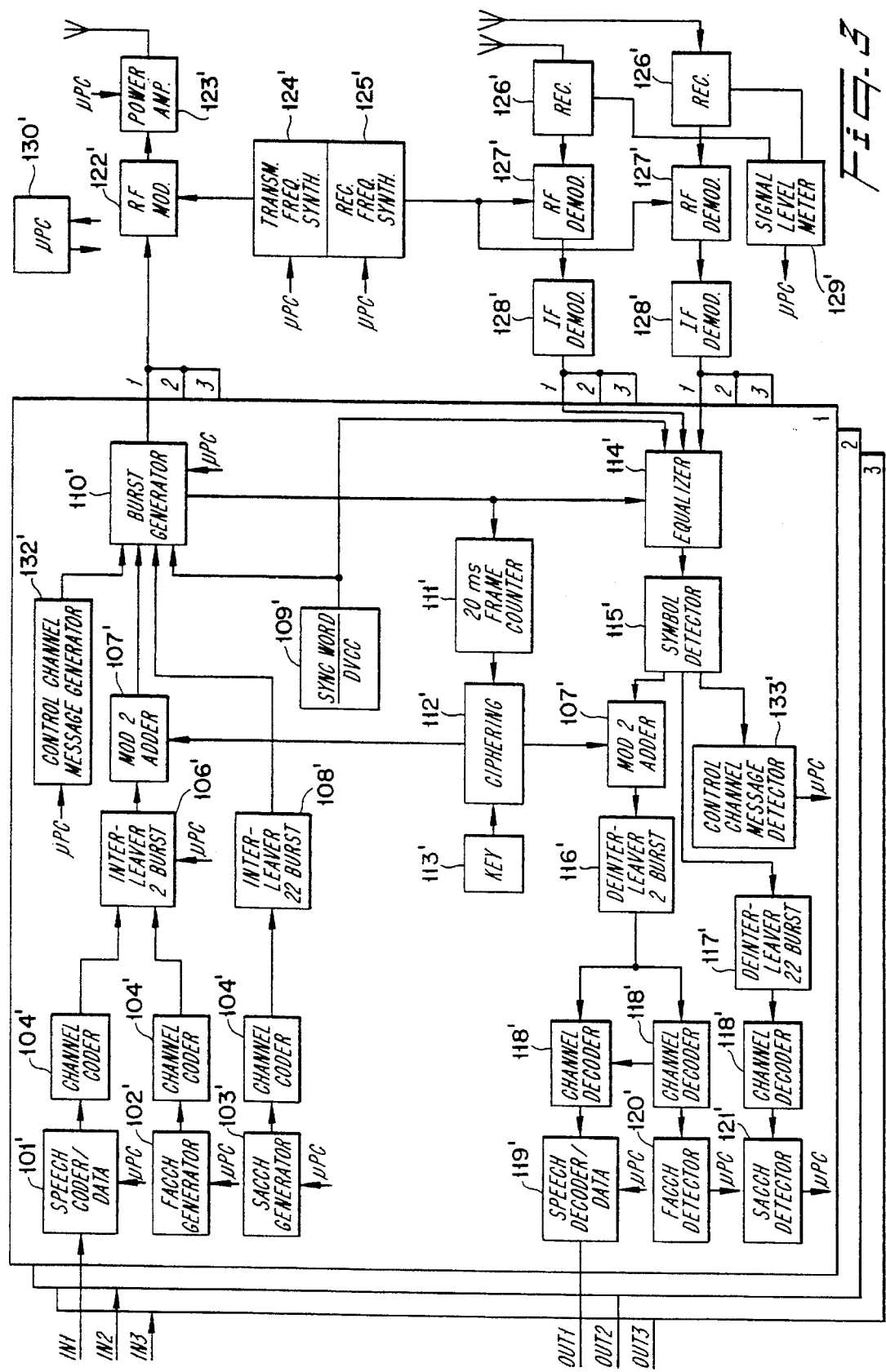

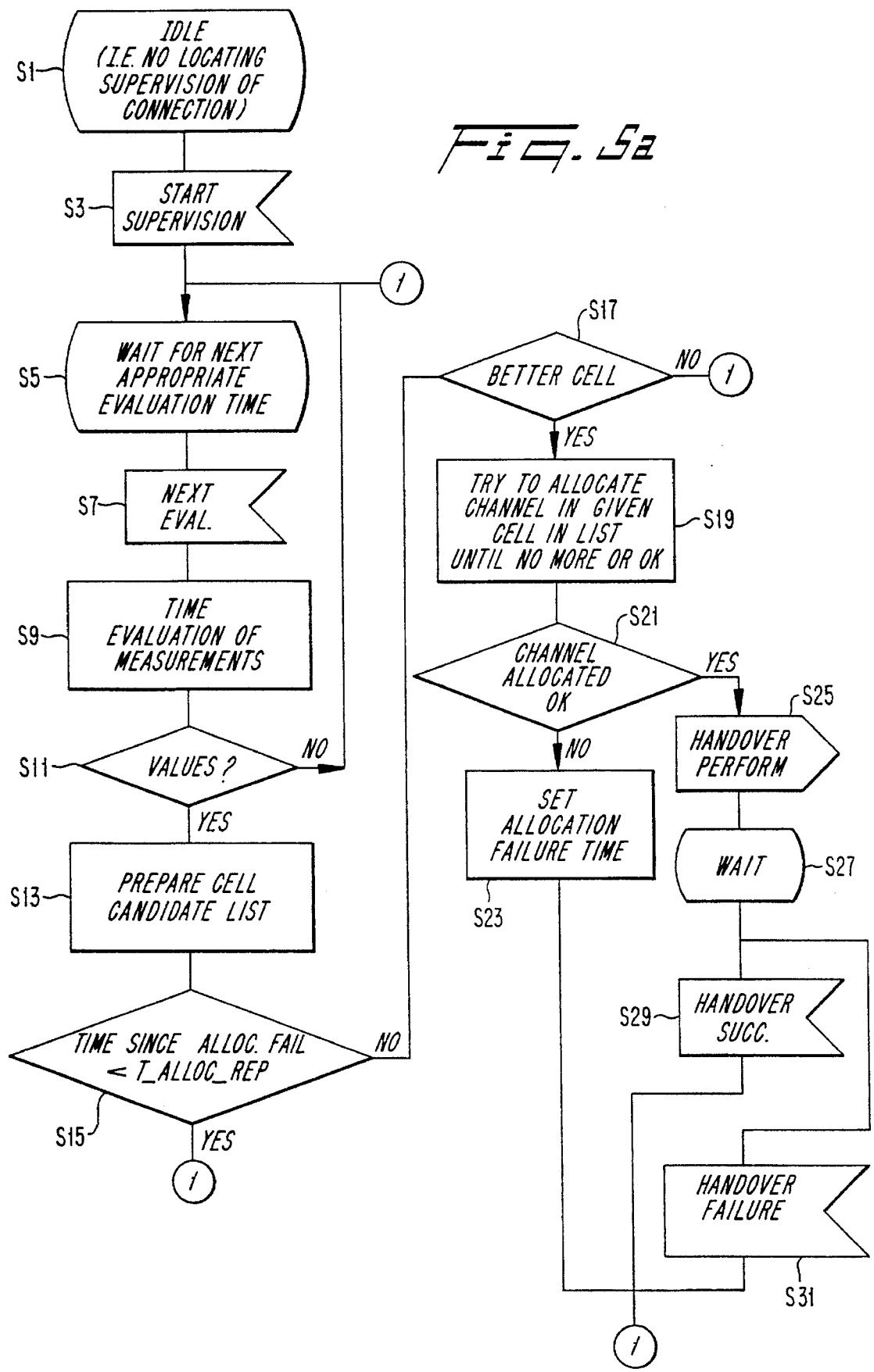

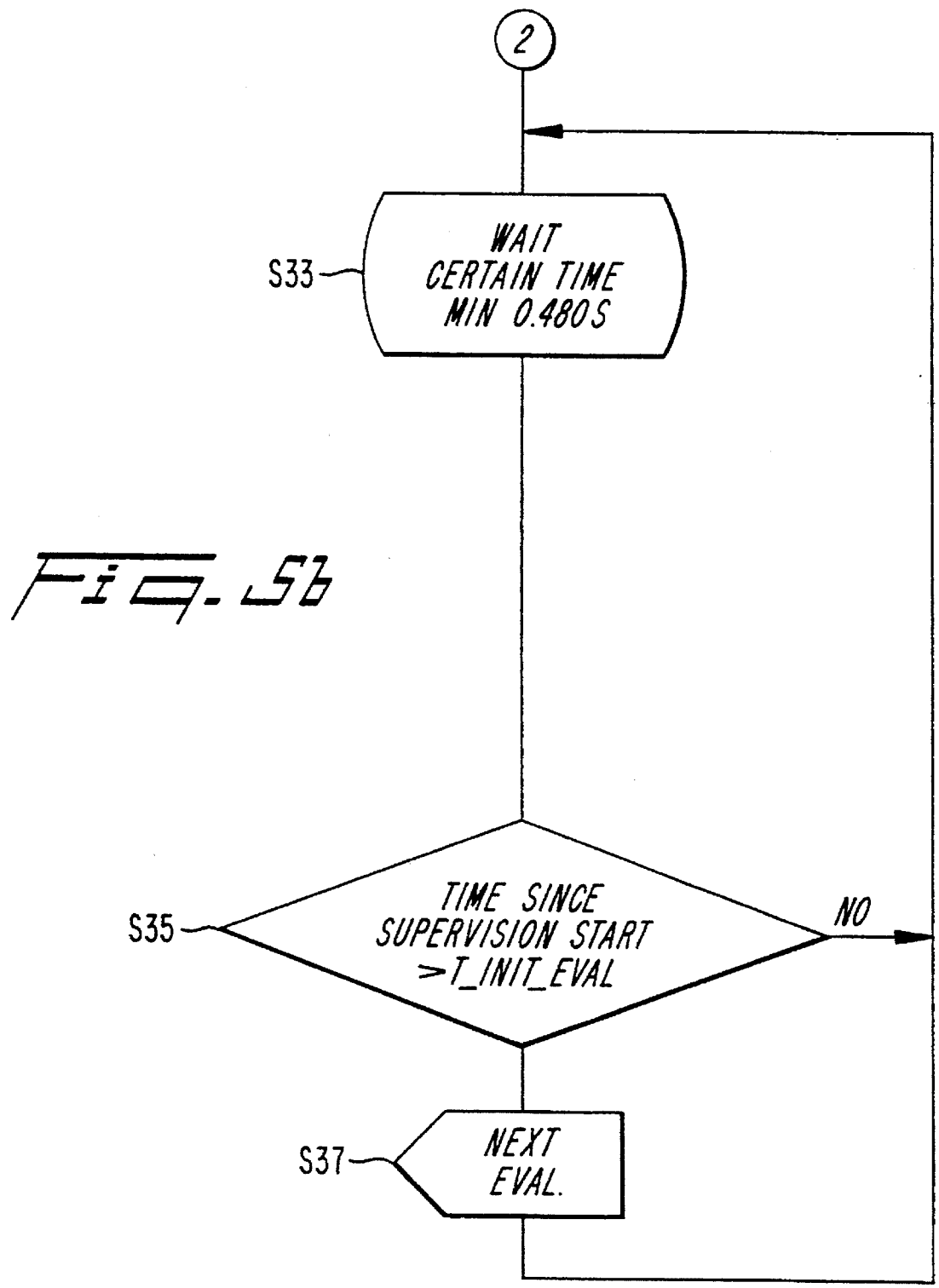

RADIOTELEPHONE LOCATING AND HANDOFF USING ALTERNATIVE CRITERIA

FIELD OF THE INVENTION

The present invention relates to mobile station locating and handoff in a cellular mobile radiotelephone system and more particularly to such a system employing alternative handoff criteria.

BACKGROUND OF THE INVENTION

In a cellular mobile radiotelephone system, a collection of cells or radio base stations each having a specified coverage area is controlled to provide duplex radio communications with a large number of mobile stations throughout a geographical area. The coverage areas or cells of the individual base stations overlap to provide continuous coverage. Responsibility for mobile stations in overlapping areas is assigned based on various criteria to define in effect a patchwork of non-overlapping contiguous cells, typically illustrated as hexagons. The base stations are linked to a mobile switching center which is in turn linked to the public telephone system to allow the radiotelephone system to function as an extension of the conventional telephone system.

Hot a call connection to or from a mobile station to remain uninterrupted as the mobile station travels from cell to cell, responsibility for handling the call connection must be "handed-off" from one cell to another. To accomplish such handoff, a procedure must be provided for locating the mobile station, or tracking its position in relation to cell boundaries.

Various methods are known for locating mobile stations in a mobile radiotelephone system. Two such methods of particular importance involve signal strength monitoring and "path-loss" monitoring, respectively. Signal strength and path loss are related but distinct quantities. Signal strength is a measure of the power of a received radio frequency signal. Path loss is a measure of the decrease in power of a radio frequency signal during transit of the signal from transmitter to receiver. Path loss may be calculated from signal strength if transmission power is known.

Most present-day mobile radiotelephone systems use signal strength to determine the location of mobile stations. When the signal strength of a mobile station falls below a specified threshold, for example, the mobile station is assumed to nave passed beyond the boundaries of the currently-responsible cell. The mobile station is determined to have entered the neighboring cell that registers the highest signal strength for the mobile station.

One mobile radiotelephone system, the GSM system, is known to use path loss for locating the position of mobile stations and enjoys several important advantages over position locating techniques using signal strength. By providing that a mobile station is always associated with the cell that results in the lowest path loss for that connection, communications may be achieved using the least possible power. Also, base station transmission powers may be adjusted (for example increasing the power of a base station experiencing problems being properly received by mobile stations) without affecting cell boundaries as would happen using signal strength. Also, using path loss instead of signal strength, uniform cell boundaries are applicable to mobile stations transmitting at different power levels. Using signal strength, a call connection with a mobile station transmitting at high power will be maintained at a greater distance than a call connection with a mobile station transmitting at a lower power such that the effective cell size is different for mobile stations of different power classes.

The use of path loss alone to locate mobile stations may in some instances, however, be disadvantageous. If, for example, an established call connection enjoys little or no signal-strength margin (excess signal strength above the bare minimum required to sustain communications), and if a different criterion than signal strength is used to determine the need for handoff, then the call connection may be interrupted when its signal strength margin has been exhausted without a handoff having been arranged. The foregoing class of calls may be referred to as being signal-strength limited, or "carrier-to-noise" (C/N) limited. When a call connection is not C/N limited, the path loss criterion may be advantageously employed. Such calls are more susceptible to interference from other calls than to low signal strength and may be referred to as "carrier-to-interference" (C/I) limited. The path loss criterion minimizes interference by assuring that the greatest possible amount of radiated energy reaches its intended destination.

What is needed, then, is a mobile radiotelephone system that takes advantage of the benefits of using path loss to make locating and handoff decisions, including the benefits of power conservation, low interference, and fixed cell boundaries, and that at the same time avoids the disadvantages associated with the use of path loss, including possible call connection interruption and loss of the call.

SUMMARY OF THE INVENTION

In a cellular mobile radiotelephone system having a plurality of cells providing radio coverage by a plurality of base stations and having a plurality of mobile stations, the location of a mobile station with respect to cell boundaries is identified using measurements, performed at the mobile station or at selected cells, of transmissions from the cells or transmissions from the mobile stations. When a cell is found that meets a specified standard with respect to a call connection in progress according to a first radio-signal criterion, a handoff candidate cell is selected according to a second different radio-signal criterion. When no cell is found that meets the specified standard, a cell is selected according to the first radio-signal criterion. Handoff to the selected cell is attempted if that cell is not presently handling that call. More particularly, the first radio-signal criterion may be signal strength and the second radio-signal criterion may be path loss. When a cell is found that meets the signal-strength criterion, the cell is determined to have sufficient signal strength margin so that the path loss criterion may be used instead. As mentioned above, use of the path loss criterion has the advantages of conserving power, reducing interference, and allowing effective cell boundaries to remain fixed. When no cell is found that meets the signal-strength criterion, the call connection is determined to be signal-strength limited such that the signal strength criterion is used to select the cell having the greatest signal strength.

BRIEF DESCRIPTION OF THE DRAWINGS

These and other features and advantages of the invention will be readily apparent to one of ordinary skill in the art from the following written description, used in conjunction with the drawings, in which:

FIGS. 1a through 1e are geometrical illustrations for explaining the disadvantages associated with deciding handoff on the basis of path loss only;

FIG. 3 is a block diagram of a base station portion of a radio telephone system;

FIGS. 5a and 5b, is a flowchart representation of a locating operation performed by the cellular radiotelephone system;

DETAILED DESCRIPTION OF THE PREFERRED EMBODIMENTS

Figure 1A:
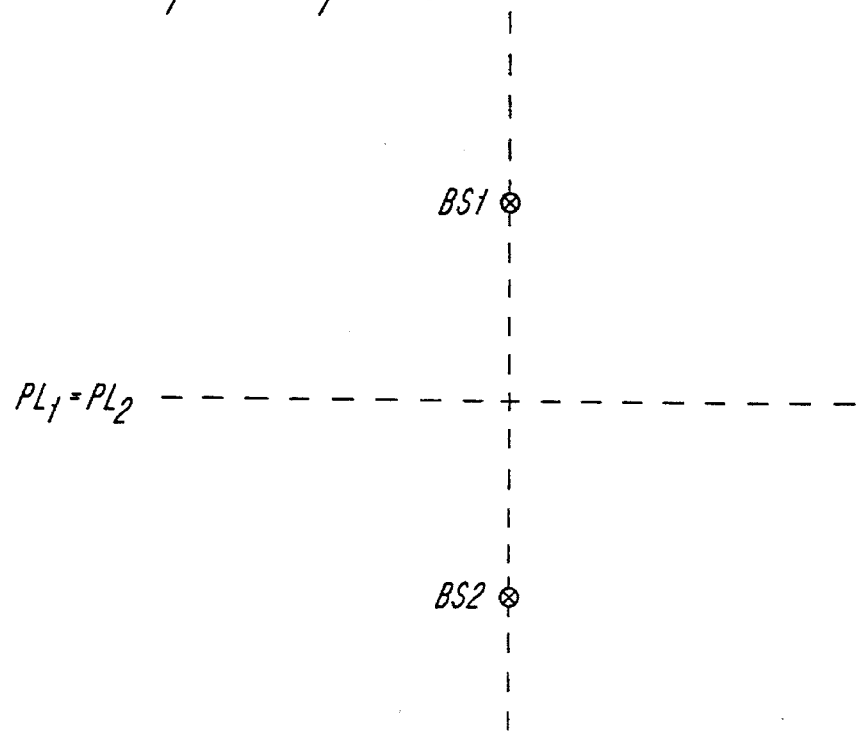

The principle underlying the present invention may best be understood with reference to FIG. 1e. For ease of explanation, however, different features of FIG. 1e will first be explained separately with reference to FIGS. 1a–1d.

FIG. 1a illustrates two base stations $BS_1$ and $BS_2$ in a cellular mobile radiotelephone system. The base stations are located along an imaginary line, the line segment extending between the two base stations being bisected by a transverse imaginary line. Every point along the transverse imaginary line is equidistant from base stations $BS_1$ and $BS_2$. Since path loss is mainly a function of distance, the path loss $PL_1$ experienced by a signal transmitted from base station $BS_1$ is equal to the path loss $PL_2$ experienced by a signal transmitted from base station $BS_2$ at all points along the transverse line. If the cells to be covered by base stations $BS_1$ and $BS_2$ were to be of equal size (considering handoff), then the transverse line would form the boundary between cell 1 and cell 2 according to the path loss criterion.

Figure 1B:
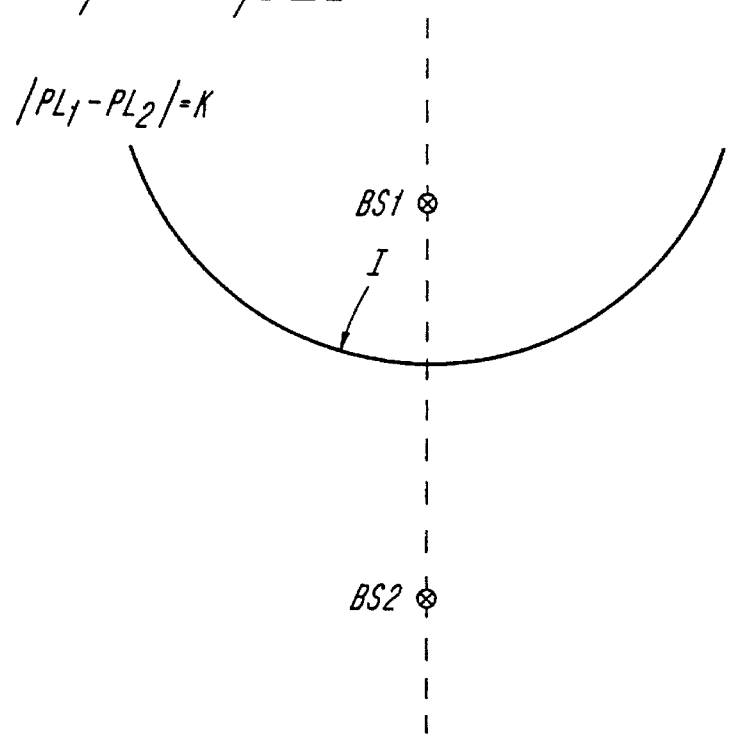

It is often convenient, however, to have adjacent cells such as cell 1 and cell 2 be of different sizes. Therefore, instead of defining the boundary between cell 1 and cell 2 as the equal-path-loss transverse line in FIG. 1a, the boundary may be defined as shown in FIG. 1b by a curve I along which the magnitude of the difference in dB between the path loss $PL_1$ experienced by a signal transmitted from base station $BS_1$ and the path loss $PL_2$ experienced by a signal transmitted from base station $BS_2$ is a constant K. This curve will have the shape of a circle.

In general, the signal strength of a signal transmitted from a base station will be equal at all points an equal distance from the base station, i.e., along a circle. In FIG. 1c, two such equal-signal-strength circles are drawn with respect to base station $BS_1$ and two corresponding equal-signal-strength circles of corresponding size are drawn with respect to base station $BS_2$. The smaller of the circles may be said to represent a sufficient signal level at which a call may be received with good quality. The larger of the circles may be said to represent a minimum signal level at which a call may be received but with barely acceptable quality. As noted previously in relation to FIG. 1a, path loss between the two cells is equal along a transverse line bisecting the line segment joining base stations $BS_1$ and $BS_2$. Assuming the transmission power PWR1 of base station $BS_1$ is the same as the transmission power PWR2 of base station $BS_2$, then the signal strength SS1 of a signal transmitted from base station $BS_1$ is also equal to the signal strength SS2 of a signal transmitted from base station $BS_2$ along the same transverse line. In such a situation, whether the cell boundary is defined according to a path loss criterion or a signal strength criterion, the result will be the same.

To make adjacent cells different sizes according to the signal strength criterion, however, the transmission powers of the respective base stations must be scaled accordingly instead of being equal. FIG. 1d illustrates the case where transmission power PWR1 on base station $BS_1$ is less than the transmission power PWR2 of base station $BS_2$. As a result, the radius of the circle IV defining a sufficient signal level with respect to base station $BS_1$ is less than the radius of a corresponding circle VI defining a sufficient signal level with respect to base station $BS_2$. Likewise, the radius of the circle V defining a minimum signal level with respect to base station $BS_1$ is less than the radius of the corresponding circle VII defining a minimum signal level with respect to base station $BS_2$. The distance between the circles IV and V is therefore proportionally shorter than the distance between the circles VI and VII. Equal signal strengths between the two cells no longer occur along a straight line as in FIG. 1c but along a smooth curve III drawn through the intersections of corresponding ones of the circles.

Referring now to FIG. 1e, the disadvantage of using path loss only as the main criterion for deciding handoff will be explained. FIG. 1e is a composite of FIGS. 1b and 1d, hence the description of those figures will apply equally with respect to FIG. 1e. For completeness, however, portions of the previous description will be repeated. Reference numerals $BS_1$ and $BS_2$ designate respective base stations located along a median represented by a vertical dashed line. The distance by which the base stations are separated is bisected by a horizontal dashed line. Since path loss, in an idealized environment and assuming that frequency is kept constant, is essentially only a function of distance, the horizontal dashed line represents an equi-path loss line with respect to base stations $BS_1$ and $BS_2$.

It is useful, however, to define with respect to base stations $BS_1$ and $BS_2$ cells having different sizes. The curve I therefore represents the collection of points whose distance from base station $BS_2$ divided by the distance to base station $BS_1$ is a constant, resulting in a measured path loss from those points to base station $BS_2$ that is X dB greater than the path loss from those points to base station $BS_1$. With respect to both base stations $BS_1$ and $BS_2$ is also defined a pair of concentric circles (IV, V, VI, and VII) representing the distance at which a mobile station signal can be received by a mobile station with "sufficient" and "minimum" signal levels, respectively. A sufficient signal level is one at which a call may be received with good quality. A minimum signal level is one at which a call may be received but with barely acceptable quality—at any lower signal level, the call cannot be continued. As noted previously, the actual physical coverage of the two base stations overlaps, with the choice between base stations in the overlapping areas B, C, D being governed by the handoff decision process.

The two pairs of concentric circles IV, V, and VI, VII and the curve I may be used to identify regions having different radio signal characteristics and which are identified by different shadings. In a region D indicated by horizontal shading, the signal of a mobile station is received at each of the base stations $BS_1$ and $BS_2$ at a sufficient level. In the regions B indicated by vertical shading, on the other hand, the signal of a mobile station is received at each of the base stations at a minimum level. In the regions C indicated by slant-left shading, the signal of a mobile station is received at one of the base stations at a sufficient level and at the other of the base stations at a minimum level. Finally, in the regions A indicated by slant-right shading, the signal of a mobile station is received at base station $BS_1$ at a minimum level but is not received at base station $BS_1$ at either a sufficient or minimum level. In these A regions, unlike the other identified regions B–D, the signal from a mobile station can be received at a minimum level by only one of the base stations.

Referring to the lower-most boundary of the regions A, as a mobile station passes over the boundary from region B into region A, it leaves a region in which it may be received by base station $BS_2$ at a minimum level and enters a region in which it may be received only by base station $BS_1$ at a minimum level. In region A, however, the mobile station has not yet reached the curve I defining the boundary of cell 1 for handoff purposes in terms of the path loss criterion. Therefore, if a path loss criterion is used exclusively, the mobile station will have passed beyond the coverage of base station $BS_2$ but will not have been handed off to base station $BS_1$ with the result that the mobile station's call connection is dropped.

Such a result may be avoided in such situations by selectively using a signal strength criterion in place of the path loss criterion. In particular, the boundary between cells 1 and 2 may be defined as follows. In the horizontally shaded region D, either base station may handle a call connection with acceptable results. Because there are advantages in using a path loss criterion for deciding handoff where possible, the cell boundary is defined as the path loss curve I up until its intersection with a curve II, forming a portion of the circle VI indicative of a sufficient signal level at base station $BS_2$. From that point, the cell boundary is defined by the curve II until its intersection with the circle IV indicative of a sufficient level at base station $BS_1$. In the vertically shaded regions B, calls are signal-strength limited. The cell boundary is therefore defined as an equal-signal-strength curve III across the region. The resulting boundary, defined by the combination of curves I, II and III, divides the two cells in their area of overlapping coverage.

Figure 2:
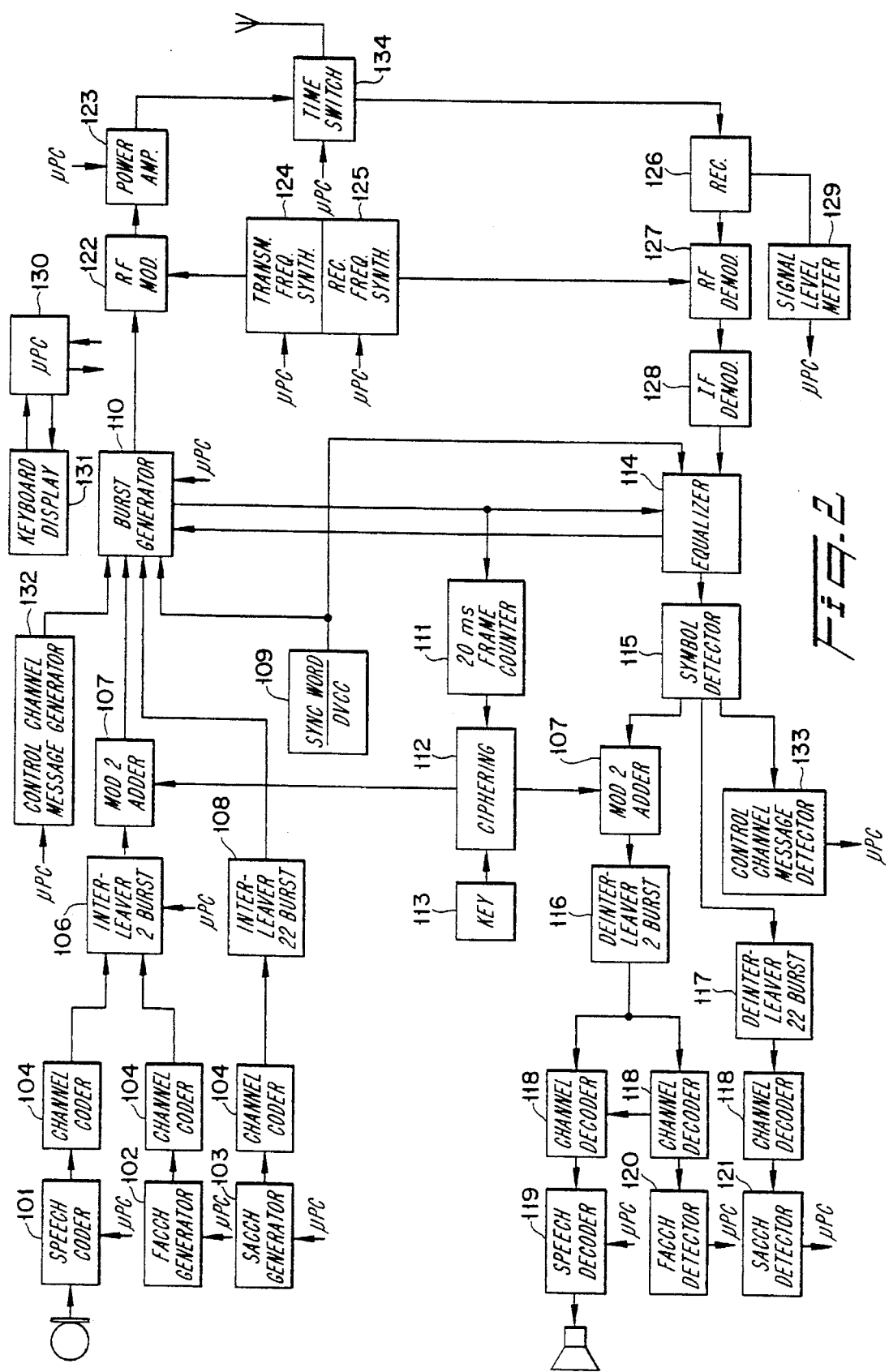
FIG. 2 is a block diagram of a mobile station portion of a mobile radiotelephone system.

FIG. 2 illustrates a base station in a cellular mobile radio system such as base stations $BS_1$ and $BS_2$ in FIG. 1. This particular example pertains to a mobile station that can be used in a digital communications system, i.e., one in which digitized voice information is transmitted between base and mobile stations. Furthermore, the operation of the system is explained in the context of full-rate transmissions in a time division multiple access (TDMA) system, in which each packet of digital information is interleaved over two spaced time slots in a frame of data. It will be readily appreciated, however, that the invention is equally applicable to other types of cellular radio systems, such as those in which information is transmitted in an analog format, transmitted digitally at a half rate, or transmitted in other access modes such as frequency division multiple access (FDMA) or code division multiple access (CDMA).

In the mobile station depicted in FIG. 2, a speech coder 101 converts the analog signal generated by a microphone into a binary data stream. The data stream is then divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g. twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g. twelve bits, are used for computing a seven-bit check.

A two-burst interleaver 106 is connected to the channel coders 104 associated with the speech coder 101 and the FACCH generator 102, respectively. The interleaver 106 is controlled by a microprocessor controller 130 so that, at appropriate times, user information over a particular speech channel is replaced with system supervision messages over the FACCH. Data to be transmitted by the mobile station is interleaved over two distinct time slots. A packet of 260 data bits, which constitute one transmitting word, is divided into two equal parts and is interleaved over two different time slots. The effects of RAYLEIGH fading are reduced in this manner. The output of the two-burst interleaver 106 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) to be associated with a particular connection. The Sync Word is a 28 bit word used for time slot synchronization and identification. The DVCC is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control message generator 132, to integrate the various pieces of information from these respective units into a single message burst. For example, according to the published U.S. standard EIA/TIA IS54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message uses a TDMA time slot reserved to a control channel, where it replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

The burst generator 110 is coupled to a frame counter 111 and the equalizer 114. The frame counter 111 updates a ciphering code utilized by the mobile station for each transmitted frame, e.g. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by the burst generator 110, is forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase: $\pm\pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123 and passes a time switch 135. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126. The signal strengths over the cellular frequencies are measured by a signal level meter 129. Signal strength values are sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original $\pi/4$-DQPSK—modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. A modulo-two adder 107 and a two-burst deinterleaver 116 reconstruct the speech data/FACCH data by assembling and rearranging information from two time slots of the received data. The symbol detector 115 supplies SACCH data to a 22-burst deinterleaver 117. The 22-burst deinterleaver 117 reassembles and rearranges the SACCH data spread over 22 consecutive frames.

The two-burst deinterleaver 116 provides the speech data/FACCH data to two channel decoders 118. The convolutionally encoded data is decoded using the reverse of the above-described coding principle. The received cyclic redundancy check (CRC) bits are checked to determine if any error has occurred. The FACCH channel decoder furthermore detects the distinction between the speech channel and any FACCH information, and directs the channel decoders 118 accordingly. A speech decoder 119 processes the received speech data from the channel decoder 118 in accordance with a speech decoder algorithm (e.g. VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. A SACCH detector 121 detects messages on the slow associated control channel and transfers that information to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station.

FIG. 3 illustrates an embodiment of a base station that can be utilized in a cellular telephone system that operates in accordance with the present invention. The base station incorporates numerous component parts which are substantially identical in construction and function to component parts of the mobiles station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', and RF demodulator 127', and an IF demodulator 128'. Furthermore, the base station does not include a user keyboard and a display unit 131 as utilized in the mobile station. Furthermore, it has been indicated in the block diagram that one frequency carries three time slots, each time slot being handled by a group of blocks "1, 2, 3".

Figure 4A:
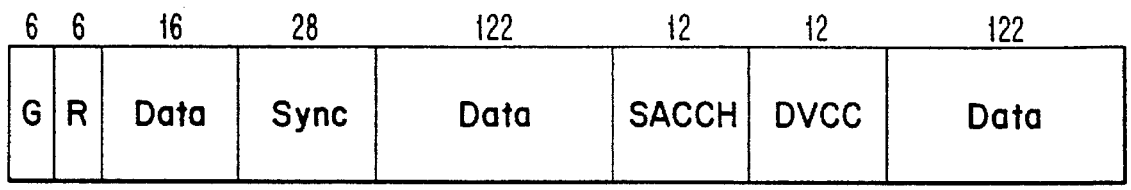
FIGS. 4a and 4b are a representation of a communications format between the mobile station of FIG. 2 and the base station of FIG. 3.
Figure 4B:
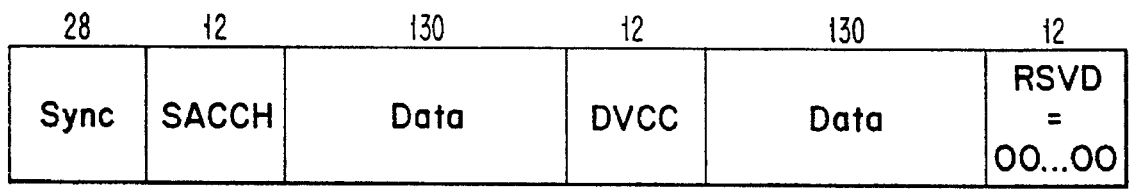

The slot format for TDMA communications between the base station of FIG. 2 and the mobile station of FIG. 3 may be as illustrated in FIGS. 4a and 4b. FIG. 4a illustrates the slot format from the mobile station to the base station, whereas FIG. 4b illustrates the slot format from the base station to the mobile station. Proceeding with a description of the fields of FIG. 4a, each field representing an area containing specified information, the field G represents a guard time used to separate the present transmission burst from the previous transmission burst, and the field R represents a ramp time necessary to fully activate the radio transmitter. A short data field then precedes a synchronization field, followed again by a longer data field. The field SACCH is used to realize a slow associated control channel for transmission of control and supervision messages between the mobile station and the base station. The field DVCC is used to transmit a digital verification color code used to distinguish different channels in the mobile radiotelephone system. The final field is again a data field. Except for the guard and ramp fields, the base station to mobile station slot format contains substantially the same fields but arranged somewhat differently.

In a preferred embodiment of the present invention, a locating function of FIG. 5, to be presently described, whereby a mobile station is located relative to cell boundaries, is performed in the mobile services center under the control of the central processor. The base stations merely try to effectuate the decision of the mobile services center with regard to handoff. Such a division of labor is not, however, necessary to the practice of the present invention.

Also according to a preferred embodiment of the present invention, measurements of signal strength, from which path loss may be calculated, are made primarily by the mobile station and relayed to the base station on the slow associated control channel SACCH. The mobile station is instructed by the base station on the SACCH concerning which channels to measure. Such an arrangement is known as mobile-assisted handoff (MAHO), and again is not essential to the practice of the present invention. Signal strength monitoring can instead be performed by neighboring base stations as is widely practiced in present-day mobile radiotelephone systems.

Referring now to FIG. 5, in particular to FIG. 5a, the locating function of the mobile services center is assumed to be initially idle (S1) prior to the establishment of a particular call connection to be supervised. At the establishment of a call connection, supervision is begun (S3) and the first in an ongoing series of measurement evaluation times is awaited (S5). At the establishment of the connection, the base station will have sent to the mobile station a set of channels corresponding to the control channels of neighboring base stations for the mobile station to perform monitoring of those channels according to MAHO. Evaluation by the base station of measurement results received from the mobile station on the SACCH is performed at intervals determined according to FIG. 5b. Essentially, evaluation is carried out every "SACCH multiframe", i.e., after the receipt of every n-th SACCH field. In one embodiment, for example, evaluation is carried out after every 22nd SACCH field has been received. An initial time limit T_INIT_EVAL is established, however, before the elapse of which no evaluation will be performed and no handoff permitted. At the appropriate evaluation time, signal strength measurements received from the mobile station are evaluated in the processor of the base station.

More particularly, in step (S9), a weighted average is calculated of down-link (from base station to mobile station) signal strength measurements for the current base station and neighboring base stations and is sent to the mobile services center. The resulting values represent the closest estimate of actual signal strength. If for some reason the values cannot be provided as scheduled (S11), the locating routine returns and waits for the next appropriate evaluation time.

Assuming that signal strength values are available, a cell candidate list is then prepared (S13) wherein the monitored cells are qualified and ranked according to path loss and signal strength. The preparation of the cell candidate list and the form of the resulting list will be described in greater detail in relation to FIGS. 6 and 7.

After the cell candidate list has been prepared, a check is made to assure that, if a handoff has been previously attempted but unsuccessfully, a specified minimum amount of time T_ALLOC_REP since the previous allocation failure of a channel in the handoff candidate cell has elapsed (S15). Insisting upon a waiting time until the next allocation attempt increases the likelihood of that allocation attempt being successful. If the required minimum amount of time has not expired, the locating routine returns to wait for the next appropriate evaluation time.

Assuming that the time limitation is satisfied, the locating routine then checks to see if there is a better cell in terms of lower path loss or greater signal strength than the present cell (S17). In other words, the routine checks to see if the present cell is highest ranked among the measured cells or if one or more cells are ranked above it. If the present cell remains the best cell, the locating routine returns to wait for the next appropriate evaluation time.

If the present cell is not the best cell, the mobile services center then tries to allocate a channel in each of the better cells in turn in order of their ranking until either the allocation is successful or the present cell is the next-best cell according to its ranking (S19). If a channel cannot be allocated, an allocation failure time is set (S23) to ensure that the minimum specified amount of time will elapse before the next allocation attempt.

If a channel is successfully allocated, a handover to the corresponding cell is then attempted (S25). The present base station waits to learn the results of the handover attempt, and if the handover was successful (S29), relinquishes communications with the mobile station in favor of its successor base station. If the handover was unsuccessful (S31), the base station resumes communication with the mobile station over the same channel as was used previously. The locating routine then returns to wait for the next appropriate evaluation time.

Figure 6:
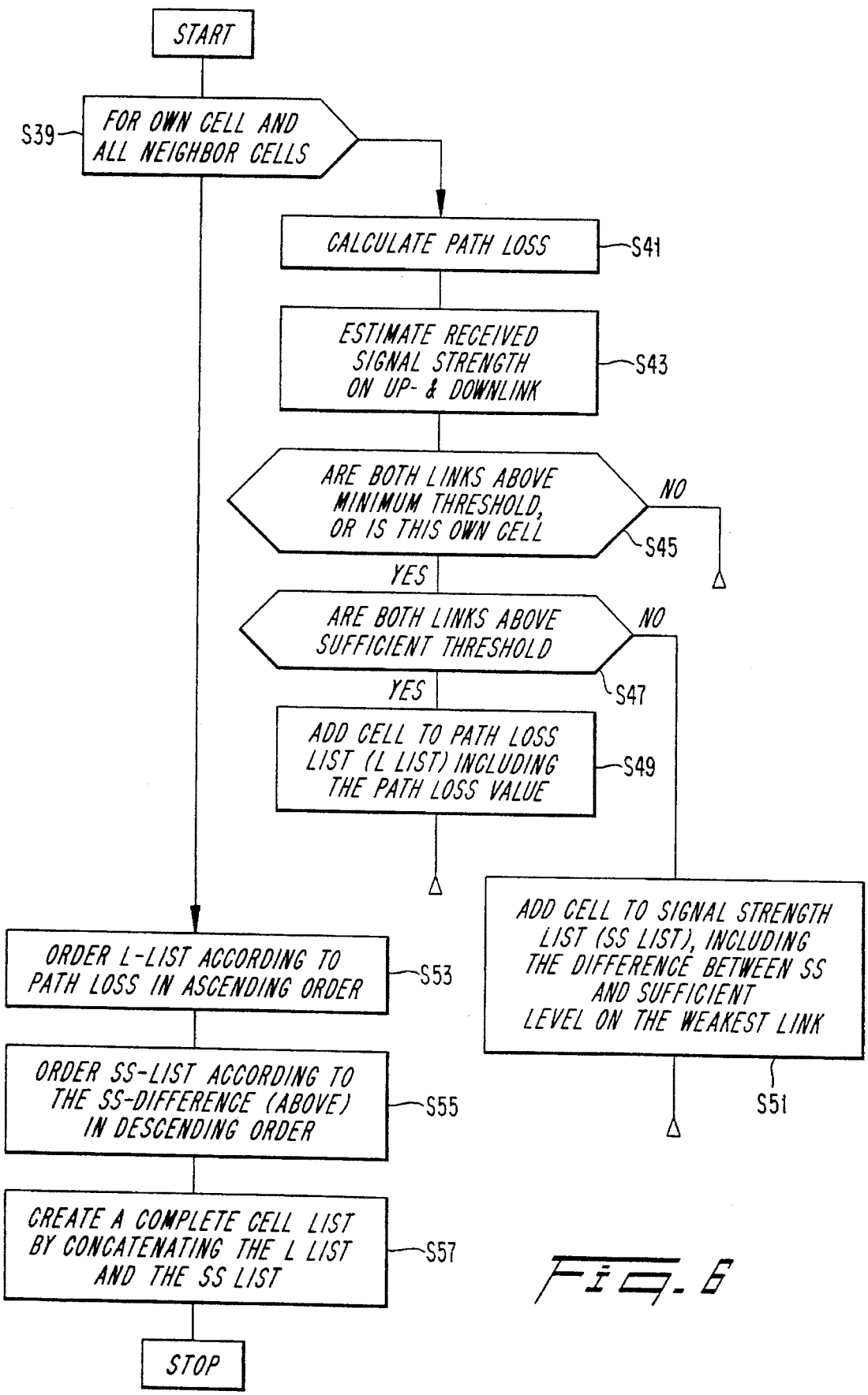
FIG. 6 is a flowchart showing in greater detail a portion of the locating operation of FIG. 5.

Using the values obtained from the evaluation of measurements in FIG. 5a, the cell candidate list is prepared in step (S13) in a manner to be presently described in relation to FIG. 6. For the present cell and each of its neighboring cells, steps S41–S51 are performed after which the cells are ranked and the complete cell list created in steps S53–S57. For each cell, path loss is calculated (S41) using the signal strength value for that cell and the known transmission power of the cell. Path loss is calculated as the ratio of received signal strength to transmitted power; i.e., $PL=P_{RX-DL}/P_{TX-BS}$ where PL represents path loss, $P_{RX-DL}$ represents received signal strength in the down-link direction, and $P_{TX-BS}$ represents power transmitted by the cell, or base station. Thereafter, the received signal strength of the cell in both the up and down link directions is estimated (S43). Normally, a signal strength value in the down-link direction will be available from measurements performed by the mobile station. It may be necessary, however, to estimate, or interpolate, a present signal strength value from a previous one. Up-link signal strength values may be estimated based on the previously calculated path loss and the known transmission power of the mobile station according to the equation $P_{RX-UL}=PL \cdot P_{TX-MS}$ where PL represents path loss, $P_{RX-UL}$ represents received signal strength in the up-link direction and $P_{TX-MS}$ represents power transmitted by the mobile station.

For a cell to qualify to participate in the cell ranking, it must either be the current cell associated with the mobile station else the cell's signal strength in both the up and down-link directions must be above the minimum threshold represented by the outer circles IV and VI in FIG. 1 as determined in step S45. If both links are additionally above the sufficient threshold illustrated in FIG. 1 (S47), then the cell is added to a path loss list (referred to hereafter as the L list) along with its path loss value (S49). Otherwise, the cell is added to a signal strength list (hereinafter referred to as the SS list) along with the difference in signal strength between the cells weakest link and the sufficient level (S51).

After these steps have been performed for the present cell and all neighbor cells, the L list is then ordered in ascending order according to path loss, the cell with the least path loss appearing at the head of the list. Then the SS list is ordered in descending order according to the previously calculated signal strength difference. Finally, a complete cell list is created by concatenating the L list and the SS list by linking the two lists with a pointer.

Figure 7:
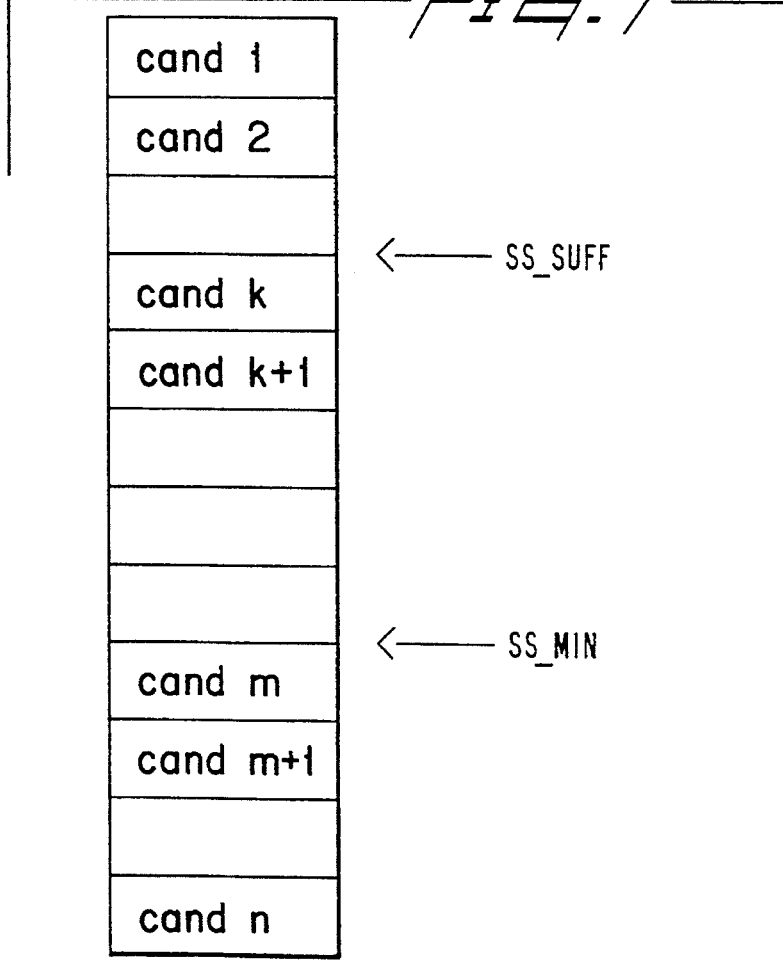
FIG. 7 is a representation of a cell list prepared according to the steps of FIG. 6 and used to decide handoff according to the present invention.

The resulting handover candidate list is illustrated in FIG. 7. Candidates that have signal strength both up-link and down-link above their respective sufficient levels are ordered according to increasing path loss. Candidates that have a signal strength up-link or down-link below their respective sufficient levels but a signal strength on both links above their respective minimum levels are ordered according to decreasing received signal strengths on the weakest link. Cells having a signal strength up-link or down-link that is below their respective minimum levels are not considered as handover candidates.

For simplicity, the foregoing description has omitted a discussion of hysteresis. Hysteresis refers to small artificial adjustment to path loss or signal strength values made when a mobile station first crosses a cell boundary and which remains in force when the mobile station recrosses the cell boundary in the opposite direction so long as the mobile station remains in a narrow geographical band surrounding the cell boundary. This adjustment avoids oscillating handoffs when a mobile station moves along a border. The provision of hysteresis is well-known to those skilled in the art.

Additional refinements may be added to the basic locating routine described above. For example, alarm supervision may be added to monitor, in addition to signal strength, transmission quality and time alignment (the latter in the case of TDMA systems). When the call connection quality between the present base station and the mobile station becomes unacceptably deteriorated or when the distance of the mobile station from the base station becomes so great as to prevent its transmission from reaching the base station in the proper time frame, an alarm is generated to initiate handoff procedures. Cells that might not otherwise be considered handoff candidates in the absence of an alarm may be considered candidates in the case of urgent necessity.

Penalties may also be associated with cells, for example at handover failure, and gradually removed over time in the absence of any further failure.

It will be appreciated by those of ordinary skill in the art that the present invention can be embodies in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a cellular mobile radiotelephone system having a plurality of cells each providing radio coverage by a base station and having a plurality of mobile stations each associated with one of said cells, a method of call handoff from a first cell to a second cell by using a radio signal criterion based on a path loss relationship between said first and second cells in order to prevent a call in progress being dropped before said handoff, said method comprising the steps of:

determining a number of candidate cells for handoff which meet a specified standard according to a signal strength criterion;

selecting one of said determined cells if this one cell in addition meets said first radio signal path-loss criterion;

when no cell is found that meets said specified standard, selecting a cell according to said radio-signal strength criterion and disregarding said radio signal path-loss criterion; and attempting handoff to said selected cell.

2. The method of claim 1 wherein said specified standard requires that a radio link from a candidate cell to a mobile station with respect to which handoff is being decided and a radio link in the opposite direction from the mobile station to said candidate cell both have signal strength margin of a predetermined mount.

3. A call handoff apparatus in a cellular mobile radiotelephone system having a plurality of cells each providing radio coverage by a base station and having a plurality of mobile stations each associated with one of said cells, said apparatus comprising:

means for determining a number of candidate cells for a hand-off which meet a specified standard according to a signal strength criterion;

means for, when a cell is found that meets said specified standard, selecting a cell according to a radio-signal path-loss criterion;

means for, when no cell is found that meets said specified standard, selecting a cell according to said radio-signal strength criterion and disregarding said radio path-loss criterion; and means for attempting handoff to said selected cell.

4. The apparatus of claim 3 wherein said specified standard requires that a radio link from a candidate cell to a mobile station with respect to which handoff is being decided and a radio link in the opposite direction from the mobile station to said candidate cell both have signal strength margin of a predetermined amount.

5. In a cellular mobile radiotelephone system, a method of call handoff comprising the steps of:

ranking cells according to a radio-signal strength criterion;

when one or more cells meet a specified standard according to said radio-signal strength criterion, ranking said one or more cells according to a radio-signal path loss criterion;

forming a final list by ranking said one or more cells ranked according to radio-signal path-loss ahead of cells that did not meet said specified standard according to radio-signal strength criterion; and attempting handoff of said call handoff to a highest-ranked cell on said final list when a cell handling said call connection is not highest ranked.

6. In a cellular mobile radio system including a mobile station and number of base stations each serving a specific service area, said base stations including a communicating base station communicating call information with said mobile station and serving one area and a neighboring base station serving another area, wherein said one area and a neighboring area have a common area in which communications both between the communicating base station and the mobile station and between the neighboring base station and the mobile station have sufficient signal level, a method of locating said mobile station in the system, comprising the steps of:

a) using a first criterion when said mobile station is within said common area, said first criterion involving determining the radio path loss of radio signals between the communicating base station and the mobile station, and b) using a second criterion when said mobile station is outside said common area, said second criterion involving determining the strength of the signals between the communicating base station and the mobile station.

7. In a cellular mobile radio system including a mobile station and number of base stations each serving a specific service area, said base stations including a communicating base station communicating call information with said mobile station and serving one area and a neighboring base station serving another area, said communicating base station serving said one area with a lower radio signal power than said neighboring base station serves said another area with said one area and said another area having a common area in which communications both between the communicating base station and the mobile station and between the neighboring base station and the mobile station have sufficient signal level, a method of locating said mobile station in the system, comprising the steps of:

a) using a first criterion when said mobile station is within said common area, said first criterion involving determining the radio path loss of radio signals between the communicating base station and the mobile station, and b) using a second criterion when said mobile station is outside said common area, said second criterion involving determining the strength of the signals between the communicating base station and the mobile station.

8. A cell handoff method in a cellular mobile radio telephone system having a plurality of cell sites and a mobile station, comprising the steps of:

a) determining associated up-link signal strength at a plurality of cell sites of transmissions from said mobile station and associated down-link signal strength at said mobile station of transmissions from said plurality of cell sites;

b) designating cell sites whose associated up-link and down-link signal strengths are both at least a sufficient level;

c) determining path loss between said mobile station and said designated cell sites;

d) ordering said designated cell sites in order of increasing path loss;

e) designating cell sites whose associated up-link and down-link signal strengths both exceed a minimum level;

f) ordering said cell sites designated in step (e) in order of increasing difference between said sufficient level and a lesser one of said up-link signal strength and said down-link signal strength;

g) ordering the cell sites designated in step b) ahead of the cell sites designated in step e) while preserving the order among the cell sites designated in step b) and preserving the order among the cell sites designated in step e); and h) attempting handoff of said mobile station call to a cell site ordered first among cell sites ordered as in step g) when said cell site is not already handling said call.

9. The call handoff method of claim 8 wherein the cell sites designated in step b) are designated in a first list, the cell sites designated in step e) are designated in a second list, and said ordering step g) comprises concatenating said first and second lists.

* * * * *